United States Patent
Labes

[11] 3,827,780
[45] Aug. 6, 1974

[54] STABLE ANIL-TYPE NEMATIC LIQUID CRYSTALS
[75] Inventor: Mortimer M. Labes, Rosemont, Pa.
[73] Assignee: Temple University, Philadelphia, Pa.
[22] Filed: Oct. 14, 1971
[21] Appl. No.: 189,315

[52] U.S. Cl......... 350/160 LC, 252/408, 260/566 F
[51] Int. Cl. ..................... C07c 131/00, G02f 1/28
[58] Field of Search.................... 252/408; 260/566; 23/230 LC; 350/160 LC

[56] References Cited
UNITED STATES PATENTS
3,597,044  8/1971  Castellano ................ 350/160 LC
3,625,591  12/1971  Freiser ..................... 350/160 LC Primary Examiner—George F. Lesmes
Assistant Examiner—M. B. Wittenberg

[57] ABSTRACT

Stable anil-type nematic liquid crystals are provided of the formula

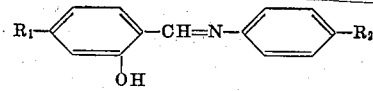

wherein $R_1$ and $R_2$ are each an alkyl, alkoxy, alkylester, aryl, aryloxy, arylester, aralkyl, carboxylic acid, halogen, nitro, cyano group or the like. The liquid crystals of this invention, because of the excellent stability, are especially useful in light valves, optical display devices and similar applications which involve the modulation of light.

4 Claims, 1 Drawing Figure

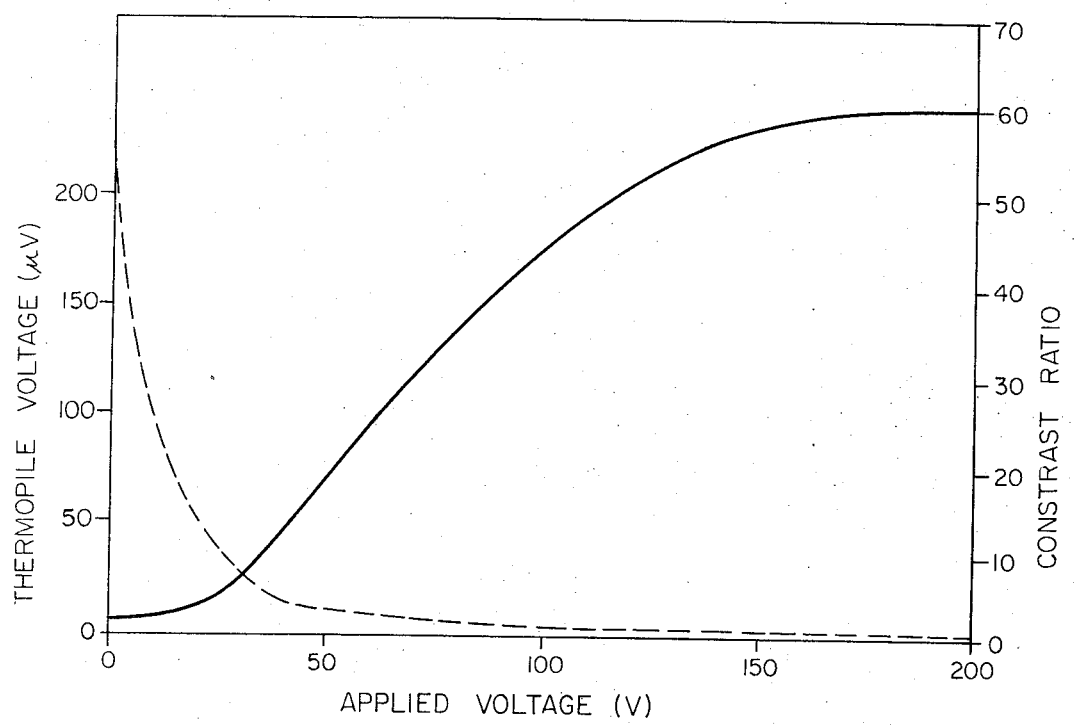

STABLE ANIL-TYPE NEMATIC LIQUID CRYSTALS

The invention described herein was made in the performance of work under a NASA contract and is subject to the provisions of Section 305 of the National Aeronautics and Space Act of 1958, Public Law 85–568 (72 Stat. 435; 42 USC 2457).

Background of the Invention

1. Field of the Invention

This invention is concerned with a novel class of an anil-type nematic liquid crystal which have improved stability.

2. Description of the Prior Art

Liquid crystals are organic compounds which exhibit certain of the properties of conventional liquids and certain of the properties of conventional crystals. The molecules of a liquid organic crystal are of a linear configuration with the major axis of the molecules being substantially longer than the minor axis of the molecule. A liquid organic crystalline substance will flow and take the shape of a container in which it is placed as is characteristic of conventional liquids. A liquid organic crystalline substance also exhibits many properties of conventional crystals such as scattering of light in a symmetrical pattern and reflecting different colors depending upon the angle from which it is viewed. A common property of all liquid crystals is that they exhibit the phenomenon of birefringence or double refraction.

Liquid crystals are conventionally classified into three generic classes, namely, smectic, nematic, and cholesteric. In the smectic class, the elongated molecules are aligned side by side in a series of distinct and separate layers. In the nematic class of liquid crystals, the elongated molecules are aligned parallel to each other along their major axis but the molecules are intermingled with each and do not form into separate layers as is characteristic of smectic liquid crystals. The cholesteric crystals are made up of nematic type layers, each suceeding layer being twisted by a small angle resulting in a helical array. An extensive discussion of the properties of liquid crystals is set out in the article "Liquid crystals" by James L. Fergason, Scientific American, August 1964.

Liquid crystals were known to exist for a long period of time but remained primarily a laboratory curiosity. However, relatively recently there has been an appreciation that the properties of liquid crystals could be used to advantage in various apparatus, such as electro-optical elements, for example, light valves and optical display devices which involve modulation of light. It has been found as reported by George H. Heilmeier in "Liquid Crystal Display Devices", Scientific American, 222, 100 (1970), that when a thin film of a liquid crystal material is sandwiched between two sheets of glass, that the film is clear. However, when an electric field is applied to a predetermined area of the film, the film of liquid crystals in the predetermined area will become turbulent and scatter light. By varying the size and shape of the turbulent areas optical images can be formed. Since the optical images are produced by scattering of ambient light, as opposed to conventional cathode tubes which produce their own light, the images have more of the appearance of a printed page than a televised image. Further, since liquid crystals reflect ambient light rather than generate light, they can be used under a wide range of lighting conditions including direct sunlight which wash out images produced by conventional light generating devices. In addition, since the light which is reflected is ambient light rather than generated light, a considerably lesser amount of energy is required to operate the devices.

Nematic type liquid crystals are especially useful in the optical display devices since in a nematic liquid crystal compound the dipole moment of the molecule lies along its major axis. When an electric field is applied to the nematic liquid crystals in a particular area, a combination of electrohydrodynamically induced motion and direct dipole alignment causes a significant amount of disturbance aligning the molecules in a new configuration wherein the major axis of the molecules are perpendicular to the axis of the other nematic crystals in the film. This effect is referred to as dynamic scattering and results in the optical image produced having the clear sharp definition, as is required in most optical display devices.

Once the voltage is shut off the electric field is removed and the nematic type liquid crystals revert to their former position. The image is thus erased. Various methods can be used to preserve the semi-permanent images on the electro-optic display devices such as using a combination of nematic liquid crystals and cholesteric liquid crystals or by using a dyestuff along with the nematic liquid crystal material.

Typical liquid crystal devices are made by placing a thin film of the nematic liquid crystal material between two plates of glass, quartz or the like, each of which on one side has been coated in preselected areas with a conductive material. At least one of the coatings should be transparent for purposes of viewing the electro-optical image. If the device is to be used to control light transmissions both electrodes must be transparent. However, when the device is to be used as an optical display device, the rearward electrode is preferably highly reflective so as to intensify the image. The preselected areas are connected to suitable electrical leads so that a given section can be energied as required to produce the desired optical image.

As can readily be appreciated, the electro-optical devices using nematic liquid crystals have great potential. However, to date, considerable problems have been encountered in the manufacture of these devices so that they will operate over an extended period of time especially when they are subjected to a relatively large number of electrical transformations generally required in devices of this type. The problem has basically been that the nematic liquid crystal compound heretofore suggested have been relatively unstable. After a relatively short period of time, the compounds break down into compounds which are not nematic in characteristics.

The compounds which generally exhibits nematic liquid crystal characteristics are linear in molecular structure. Numerous compounds have heretofore been suggested. Typical compounds are disclosed in Williams U.S. Pat. No. 3,322,485 in which various derivatives of dienoic acid, azoxybenzene, benzoic acid and the like are disclosed as being suitable.

French Patent 1,537,000 further discloses the use of anil-type compounds of the general formula

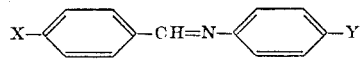

wherein X and Y are substituents such as alkoxy and alkylesters for use in liquid crystal optical display devices.

Unfortunately, however, all of the compounds heretofore suggested have to a greater or lesser degree proven to be unstable when used in liquid crystal electro-optical display devices.

Accordingly, it is an object of this invention to overcome the aforementioned problems and difficulties of the prior art.

An additional object of this invention is to provide stable nematic type liquid crystal compounds which are suitable for use in electro-optical display devices.

It is a still further object of this invention to provide stable anil-type liquid crystal compounds.

Other objects and advantages of this invention will become further apparent hereinafter.

BRIEF SUMMARY OF THE INVENTION

The object of this invention has been achieved by providing a novel class of o-hydroxy substituted anil-type nematic liquid crystals which have improved stability.

BRIEF DESCRIPTION OF THE DRAWING

The FIGURE is a graph showing the electro-optical properties of a typical nematic liquid crystal of this invention.

DESCRIPTION OF THE PREFERRED EMBODIMENTS

The class of compounds which have been found in accordance with the teaching of this invention to have improved stability are represented by the formula

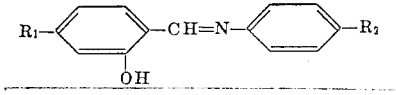

Formula I wherein $R_1$ and $R_2$ are each a member selected from the group consisting of alkyl, alkoxy, and alkylester having 1-20 carbon atoms and preferably 1-7 carbon atoms; alkylene having 2-20 carbon atoms and preferably 2-7 carbon atoms; aryl, aryloxy and arylester having 6-15 carbon atoms; carboxylic acid; halogen; nitro and cyano with at least one of the above groups $R_1$ and $R_2$ being an organic radical as defined above.

The groups $R_1$ and $R_2$ are selected so that the compound of Formula I is a liquid crystal and exhibits nematic behavior at a temperature at which the electro-optical device in which the compound is utilized will be operated. In general, the electro-optical devices are preferably operated from below room temperature to somewhat elevated temperatures, for example, −5°-100°C. It has been found that the lower molecular weight compounds included within the scope of Formula I such as those in which the groups $R_1$ and $R_2$ are lower alkyls or lower alkoxys are liquid and exhibit nematic crystalline behavior in the above temperature range.

It has also been found by using mixtures of the compound of the formula that it is possible to form eutectics which have substantially lower, higher or broader effective temperature ranges in which they can be used as compared to the individual compounds comprising the eutectic.

The anil-type nematic crystal compounds and compositions of the invention as noted above, have excellent chemical stability as compared with the compounds heretofore employed, especially in comparison with anil-type compounds such as those disclosed in French Patent 1,537,000. The reasons for the exceptional stability of the anil-type compounds of this invention is believed to be due to the presence of the hydroxy group in the ortho position. The hydroxy group hydrogen bonds with the nitrogen atom of the anil linkage to form a compound which can be represented by the formula

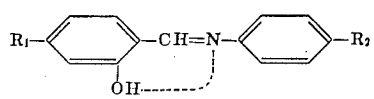

The hydrogen bonded ring thus formed is chemically stable. When the o-hydroxy group is not present in the ring, the compound is readily broken at the anil linkage and the nematic crystalline properties of the compound are destroyed.

The compounds of this invention are prepared in a conventional manner. A para-substituted o-hydroxy benzaldehyde is prepared in accordance with the general procedure described in Zemplen et al., Acta Chim, Hung 22,449 (1960). Equimolar quanties of the para-substituted o-hydroxy, benzaldehyde and a para-substituted aniline are dissolved in absolute ethanal, and then blended and heated at the boiling point of the mixture for 30 minutes. The mixture is cooled to a 0°C at which point a crystalline solid forms. The solid is recovered and recrystallized from either ethanol or another suitable solvent such as hexane. The process is shown by the following formula

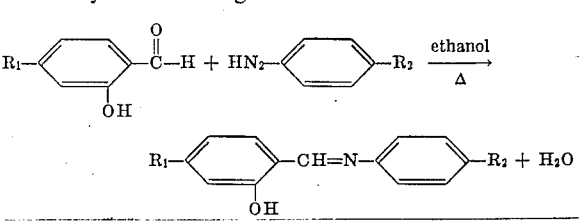

The following examples are given by way of further illustration of the present invention and are not intended to limit the scope of the present invention beyond that of the subjoined claims. All parts and percentages are parts and percentages by weight, not volume unless otherwise noted.

EXAMPLE 1

153 g of p-methoxy -o- hydroxybenzaldehyde (1 mole) and 125 g of p-n-butylaniline (1 mole) were dissolved in absolute ethanol. The resulting mixture was stirred and heated to the reflux point of the mixture and reflux for 30 minutes. The reaction mixture was cooled to 0°C and the desired product crystallized out. The reaction medium was decanted and the crystalline reaction product was recrystallized twice in ethanol. The purified product was analyzed to determine if the desired N-(o-hydroxy-p-methoxybenzylidene)-p-n-butyl aniline was obtained. The elemental analysis was found to be as follows:

|       | Found | Theoretical |
|-------|-------|-------------|
| % C   | 76.36 | 76.29       |
| % H   | 7.54  | 7.46        |
| % N   | 5.21  | 4.94        |

The crystals thus obtained upon cooling from the isotropic phase remained nematic to < 8°C in a capillary melting tube. In a thin film such as would be used in an electro-optical device crystallization occured at about 26°C.

N-(o-hydroxy -p-methoxybenzylidene)-p-n-butyl aniline was evaluated for the dynamic scattering properties by measuring the transmission as determined by a thermopile reading of a 24μ layer sandwiched between two tin-oxide coated quartz plates. The FIGURE shows the voltage transmission as well as the calculated contrast ratio which obtain a value > than 60. These results were obtained at 37°C. However, the material exhibits dynamic scattering effects down to 26°C at which point it solidified into crystals. This example was repeated numerous times and the results were reproducable. The high purity and reproducability was further established by blending materials obtained from several experiments and it was found the results were still reproducable.

In comparison the N-(p-methoxybenzylidene)-p-n-butylaniline, which is the corresponding compound without the stabilizing ortho hydroxy group, was difficult to purify and the results were considerably less reproduceable. This material also gradually decomposed during testing which further effected the reproduceability.

EXAMPLE 2

The process described in Example 1 was repeated except that compounds of the following formula were prepared using other starting materials

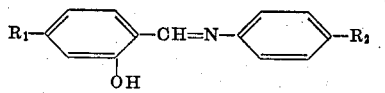

| $R_3$ | Nematic range, °C |
|-------|-------------------|
| —CN   | 141–147           |
| 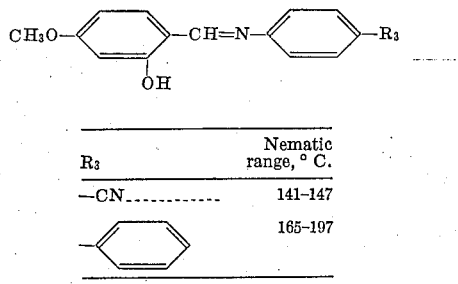 | 165–197 |

Both of the above compounds were evaluated and found to be suitable for use in electro-optical devices due to the relative stability and nematic crystal characteristics.

EXAMPLE 3

The process of Example 1 was repeated except that the following compounds were prepared

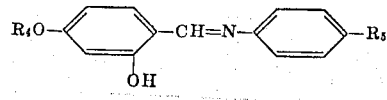

| No. | $R_4$  | $R_5$    | Nematic Range °C |
|-----|--------|----------|------------------|
| 1   | methyl | n-butyl  | 44–65            |
| 2   | methyl | n-pentyl | 75.4–79.8        |
| 3   | ethyl  | n-butyl  | 70–85.8          |
| 4   | ethyl  | n-pentyl | 76–97.9          |

All of the above compounds were found to be stable and to exhibit nematic crystalline behavior.

I claim:

1. A compound selected from the group consisting of

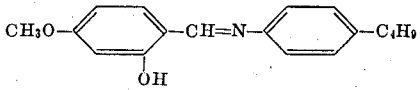

where $R_1$ and $R_2$ are each a member selected from the group consisting of alkyl, alkoxy, and alkylester having 1–20 carbon; alkylene having 2–20 carbon atoms; phenyl; carboxylic acid; halogen; nitro and cyano with at least one of said groups $R_1$ and $R_2$ being an alkyl, alkoxy, alkylester, alkylene or carboxylic acid, wherein said compound exhibits nematic liquid crystalline properties.

2. The compound according to claim 1 wherein said $R_1$ and $R_2$ are selected from the group consisting of alkyl, alkoxy or alkylester having 1–7 carbon atoms; carboxylic acid; halogen; nitro and cyano.

3. The compound according to claim 1 of the formula $$CH_3O-\langle\phantom{x}\rangle-CH=N-\langle\phantom{x}\rangle-C_4H_9$$
$$\phantom{CH_3O-\langle\phantom{x}\rangle-}OH$$

4. An electro-optical device comprising two electrodes, one of which is transparent and between which is disposed a nematic liquid crystal film wherein said nematic liquid crystal film is subjected to an electric field to cause rearrangement of the nematic liquid crystals to effect dynamic light scattering, and wherein also said nematic liquid crystal film is composed of the compound recited in claim 1.

* * * * *